(12) United States Patent
Cohen et al.

(10) Patent No.: US 7,299,349 B2
(45) Date of Patent: Nov. 20, 2007

(54) SECURE END-TO-END NOTIFICATION

(75) Inventors: Josh R. Cohen, Seattle, WA (US);
Michael Kramer, Yonkers, NY (US);
Bradley M. Hammond, Bellevue, WA (US); Paul Roberts, Bury St. Edmunds (GB); Daniel R. Simon, Redmond, WA (US); Lee M. Butler, Carnation, WA (US); Yuhang Zhu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 10/062,068

(22) Filed: Jan. 31, 2002

(65) Prior Publication Data
US 2003/0145229 A1   Jul. 31, 2003

(51) Int. Cl.
*H04L 9/00* (2006.01)
(52) U.S. Cl. .............. 713/150; 713/168; 380/247; 380/270; 370/278
(58) Field of Classification Search ........ 713/150–153, 713/161, 170–171, 201, 168; 380/247, 255, 380/270, 278, 259, 33, 277; 709/223–228, 709/246; 370/352–356, 401, 278, 312; 455/411, 410; 726/2, 3
See application file for complete search history.

(56) References Cited

U.S. PATENT DOCUMENTS

| | | | | |
|---|---|---|---|---|
| 6,047,357 | A * | 4/2000 | Bannon et al. | 711/133 |
| 6,052,788 | A * | 4/2000 | Wesinger et al. | 713/201 |
| 6,317,831 | B1 * | 11/2001 | King | 713/171 |
| 6,665,711 | B1 * | 12/2003 | Boyle et al. | 709/219 |
| 6,707,801 | B2 * | 3/2004 | Hsu | 370/312 |
| 6,909,702 | B2 * | 6/2005 | Leung et al. | 370/278 |
| 7,027,597 | B1 * | 4/2006 | Stojancic et al. | 380/28 |
| 2002/0042875 | A1 * | 4/2002 | Shukla | 713/151 |
| 2002/0101997 | A1 * | 8/2002 | Curtis et al. | 380/279 |
| 2002/0124090 | A1 * | 9/2002 | Poier et al | 709/228 |
| 2002/0156921 | A1 * | 10/2002 | Dutta et al. | 709/246 |
| 2002/0186845 | A1 * | 12/2002 | Dutta et al. | 380/247 |
| 2003/0018766 | A1 * | 1/2003 | Duvvuru | 709/223 |

(Continued)

OTHER PUBLICATIONS

R. Atkinson, "IP Encapsulating Security Payload (ESP)", p. 1-12, Aug. 1995.*

(Continued)

*Primary Examiner*—Kim Vu
*Assistant Examiner*—Yin-Chen Shaw
(74) *Attorney, Agent, or Firm*—Workman Nydegger

(57) ABSTRACT

Providing secure end-to-end notifications from a notification source to a notification sink despite the notification mechanism including one or more message transit points between the notification source and the notification sink. Initially, security information (e.g., the master security, the cryptographic algorithm, and the like) is negotiated out-of-band from the one or more message transit points so that the message transit points are not apprised of the security information. When a designated event occurs, the notification source generates a push message that includes the notification encrypted using the pre-negotiated security information. When the notification sink receives the push message, the notification sink decrypts the notification using the pre-negotiated security information, as well as supplemental information provided in the push message. Thus, the message transit points only have access to the encrypted form of the notification.

26 Claims, 7 Drawing Sheets

U.S. PATENT DOCUMENTS

2003/0072451 A1* 4/2003 Pimentel et al. ............ 380/270
2003/0120924 A1* 6/2003 Immonen .................... 713/170

OTHER PUBLICATIONS

C. Madson and N. Doraswamy, "RFC 2405: The ESP DES-CBC Cipher Algorithm with Explicit IV", p. 1-10, Nov. 1998.*

S. Kent and R. Atkinson, "RFC 2406: IP Encapsulating Security Payload (ESP)", p. 1-22, Nov. 1998.*

W. Stallings, "Cryptography And Network Security: Principles and Practice", Prentice-Hall, Inc., p. 402-431, 1999.*

Kegel, Dan, "SSL/TLS", www.kegel.com/ssl/, Sep. 25, 2001.*

Protocol Building Blocks, Bruce Schneier, Applied Crytography—Protocols, Algorithms, and Source Code in C, Associate Publisher: Katherine Schowalter, 1994, pp. 19-126 and pp. 376-410.

* cited by examiner

SECURE END-TO-END NOTIFICATION

BACKGROUND OF THE INVENTION

1. The Field of the Invention

The present invention relates to the field of notification technology. Specifically, the present invention relates to methods, systems and computer program products for providing secure end-to-end notifications over networks that include one or more intermediary message transit point.

2. Background and Related Art

Most would agree that intelligent decision-making requires access to relevant and timely information. Computer networking has greatly enhanced our ability to access such information, resulting in this modem era often being termed "the information age".

Some access to information is synchronous or "pull-oriented". In other words, information is accessed each time a request for the information is submitted. For example, users may use Internet-enabled computers to request access to information such as Web pages, e-mail accounts, calendaring applications, or the like. In this manner, synchronous access allows for broad control over the type of information accessed.

There are some cases in which it may be inefficient to perform synchronous access of information. For example, some information changes relatively often. A user may desire to know the current information despite such frequent changes. It that case, synchronous access would require frequent requests for updated information. Such information may include, for example, stock prices. In addition, perhaps the user does not care about the information unless the information has a certain value. For example, perhaps a user is not interested in a certain fifteen-year mortgage rate unless the value drops below 6%, at which time the user may consider refinancing. In this case, synchronous access might result in numerous requests for updated information even if the interest rate was not yet low enough to be interesting to the user.

In order to meet avoid these inefficiencies, computer networks may also be used to implement notifications in which a user subscribes to be notified upon the occurrence of predetermined events. If the event occurs, the notification is dispatched to the user without the user needing to request each notification. Such communication is often termed asynchronous or "push-oriented" since there need not be a user-issued request before each notification.

As a notification travels from the source computer system that generates the notification (called herein, the "notification source") to the destination computer system that receives the notification (called herein, the "notification sink"), the notification may travel through a number of different computer systems (called herein "routing points"). While many of these routing points simply forward the notification on to the next routing point, some routing points actually may have access to the notification so as to be able to intercept the content of the notification perhaps even at the application level. Such routing points are called herein "message transit points". Such message transit points perform useful tasks such as protocol translation in order to conform the notification with subsequent steps in the notification delivery. However, since the message transit points have access to the notification at such a high level, the message transit points may access and intercept the content of the notification.

FIG. 1 illustrates a network 100 in which a notification source 101 issues a notification 102 to a notification sink 103 via one or more message transit points 104. Two message transit points 104A and 104B are illustrated in FIG. 1 by way of example only. In the example where there are two message transit points, there are three hops in the transmission, one from the notification source 101 to the first transit point 104a (represented by arrow 105A), one from the first message transit point 104a to the second message transit point 104B (represented by arrow 105B), and one from the second message transit point 104B to the notification sink 103. Security is implemented on each hop.

In some cases, it may be perfectly acceptable for the message transit points to have such access to the notification. For example, the notification may not be sensitive in which case it may not matter if the message transit points read the notification. Also, the notification may be highly sensitive, but the message transit point is within a common sphere of trust with the notification source or with the notification sink. However, there may also be cases in which the notification is sensitive and in which the message transit points 104 are not within the same sphere of trust as the notification source 101 or the notification sink 103. However, in the prior art network illustrated in FIG. 1, the message transit points 104 may potentially have unfettered access to such highly sensitive notifications.

FIG. 2 illustrates a push network 200 that represents an example of the network 100 illustrated in FIG. 1. The push network 200 is described in the Wireless Application Protocol (also called "WAP") specifications published by the WAP Forum. In this example, the notification source 101 of FIG. 1 is a push initiator 201, the notification 102 is a push message 202, the notification sink 103 is a wireless device 203 and the at least one transit point 104 is a single transit point in the form of a push proxy gateway 204.

The push initiator 201 transmits the push message 202 to the push proxy gateway 204 using Push Access Protocol (also called "PAP"). In the PAP push message, eXtensible Markup Language (XML) is used to specify delivery instructions and the push content may be a Multipurpose Internet Mail Extensions (also called "MIME") media type. The push proxy gateway 204 follows the delivery instructions in performing protocol translation from PAP to Push Over-the-Air Protocol, and in forwarding the push content to the wireless device 203 using the Push Over-the-Air protocol.

While the push proxy gateway 204 may be co-located with the push initiator, the push proxy gateway 204 may also be maintained by a wireless carrier. This carrier may be in a different sphere of trust than the push initiator. However, in conventional notification technology, the push proxy gateway 204 may have unfettered access to the push message. Accordingly, what is desired are methods, systems, and computer program products for providing secure end-to-end notifications in networks that includes one or more message transit points.

SUMMARY OF THE INVENTION

Methods, systems, and computer program products are described for providing secure end-to-end notifications from a notification source to a notification sink despite the notification mechanism including one or more message transit points between the notification source and the notification sink. These message transit points perform more than mere routing of the notification, but have wide-ranging access to the notification so as to potentially be able to intercept the content of the notification if it is not encrypted.

Initially, security information is negotiated out-of-band from the notification mechanism so that the message transit points are not apprised of the security information. Such security information may include, for example, a master secret, a cryptographic algorithm selection, or other information helpful to decrypt encrypted content. When a designated event occurs, the notification source generates a push message that includes the notification encrypted using the pre-negotiated security information. The push message also includes supplemental information such as a session identifier that, combined with the pre-negotiated security information, may be used to decrypt the notification. When the notification sink receives the push message, the notification sink decrypts the notification using the pre-negotiated security information, as well as the supplemental information provided in the push message.

Note that the encrypted notification, and potentially the entire push message may be transmitted end-to-end from the notification source, through the one or more message transit points, and to the notification sink, despite protocol translations along the way. Thus, the message transit points only have access to the encrypted form of the notification. Since the message transit points were not privy to the security information that was initially negotiated between the notification source and the notification sink, it would be extremely onerous, if not impossible, for the one or more message transit points to access the content of the notification in a timely manner. Accordingly, the content of the notification would remain confidential between the notification source and the notification sink absent extreme efforts.

In one embodiment, the notification occurs using a modification of Wireless Application Protocol (WAP). The Wireless Application Protocol includes provisions for pushing notifications from a push initiator through a push proxy gateway to a wireless device. The push initiator may be considered as being a notification source, with the wireless device being a notification sink, and with the push proxy gateway being a message transit point.

Security may be provided hop-by-hop between the push initiator and the push proxy gateway, and separately between the push proxy gateway and the wireless device. However, the push proxy gateway has full access to the notification and may intercept the content of the notification with minimal effort. In other words, WAP has no provision for providing the end-to-end security that the principles of the present invention provide.

WAP uses Push Access Protocol (PAP) to forward a push message from the push initiator to the push proxy gateway. In accordance with one embodiment of the invention, the PAP message includes a multipart MIME segment in the form of an Encapsulated Security Payload (ESP) object as defined by the Internet standard RFC 2406. ESP objects have conventionally been used for implementing security in an Internet Protocol context as described by RFC 2406. It would not at all be apparent that such an ESP object would be useful in the push context of WAP.

The push proxy gateway extracts the ESP object from the PAP message, and then includes the object in a Push Over-the-Air protocol message to be delivered via Short Message Services (SMS). The wireless device then receives the SMS message with the ESP object, and then interprets the ESP object. The clear-text information in the ESP object is then used, along with the pre-negotiated security information, to decrypt the encrypted payload that includes the notification.

Accordingly, using the principles of the present invention, a user does not have to sacrifice security when receiving notifications at a wireless device. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
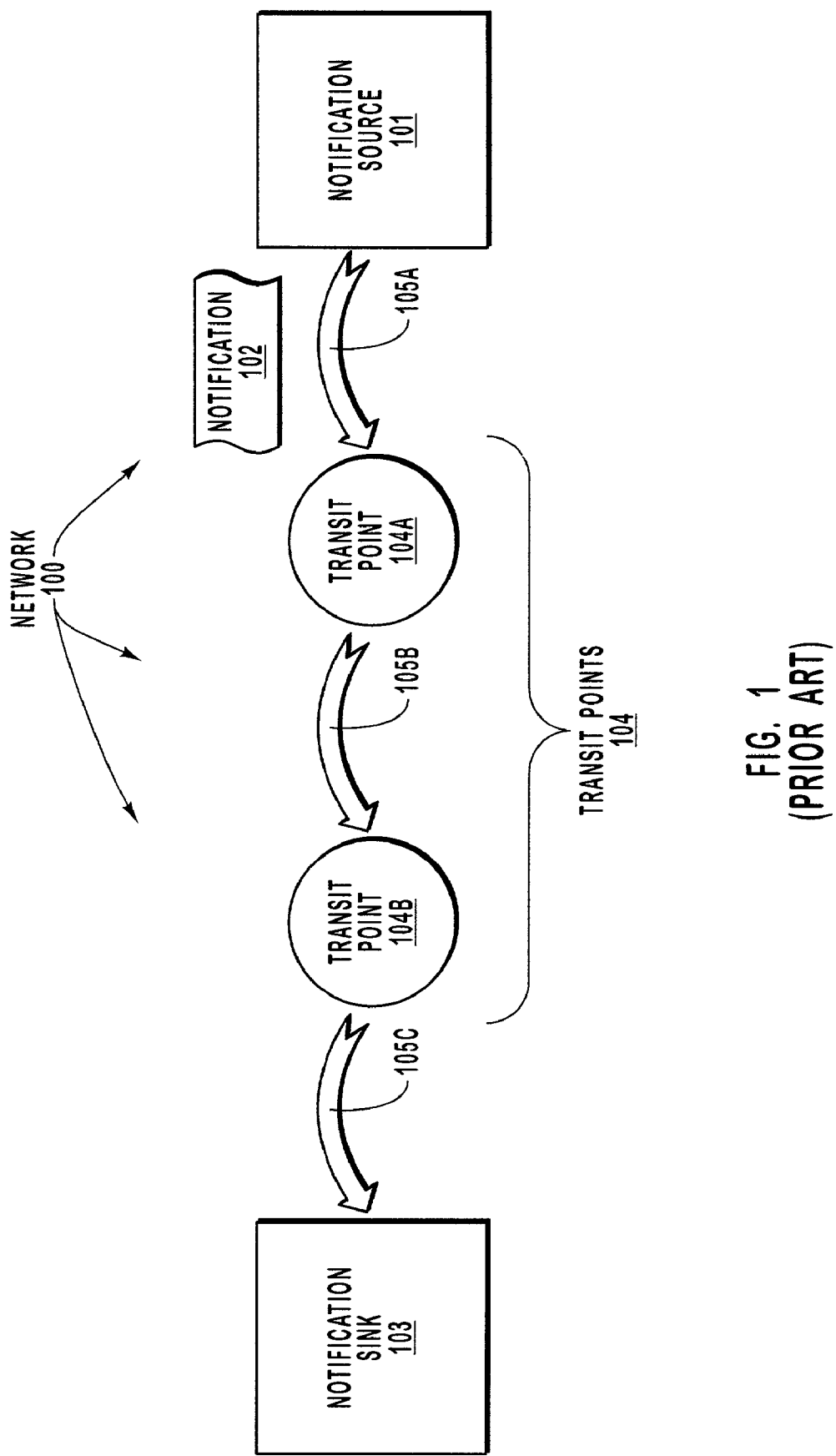
FIG. 1 schematically illustrates a conventional network in which a notification may be transmitted from a notification source to a notification sink via one or more message transit points.
Figure 2:
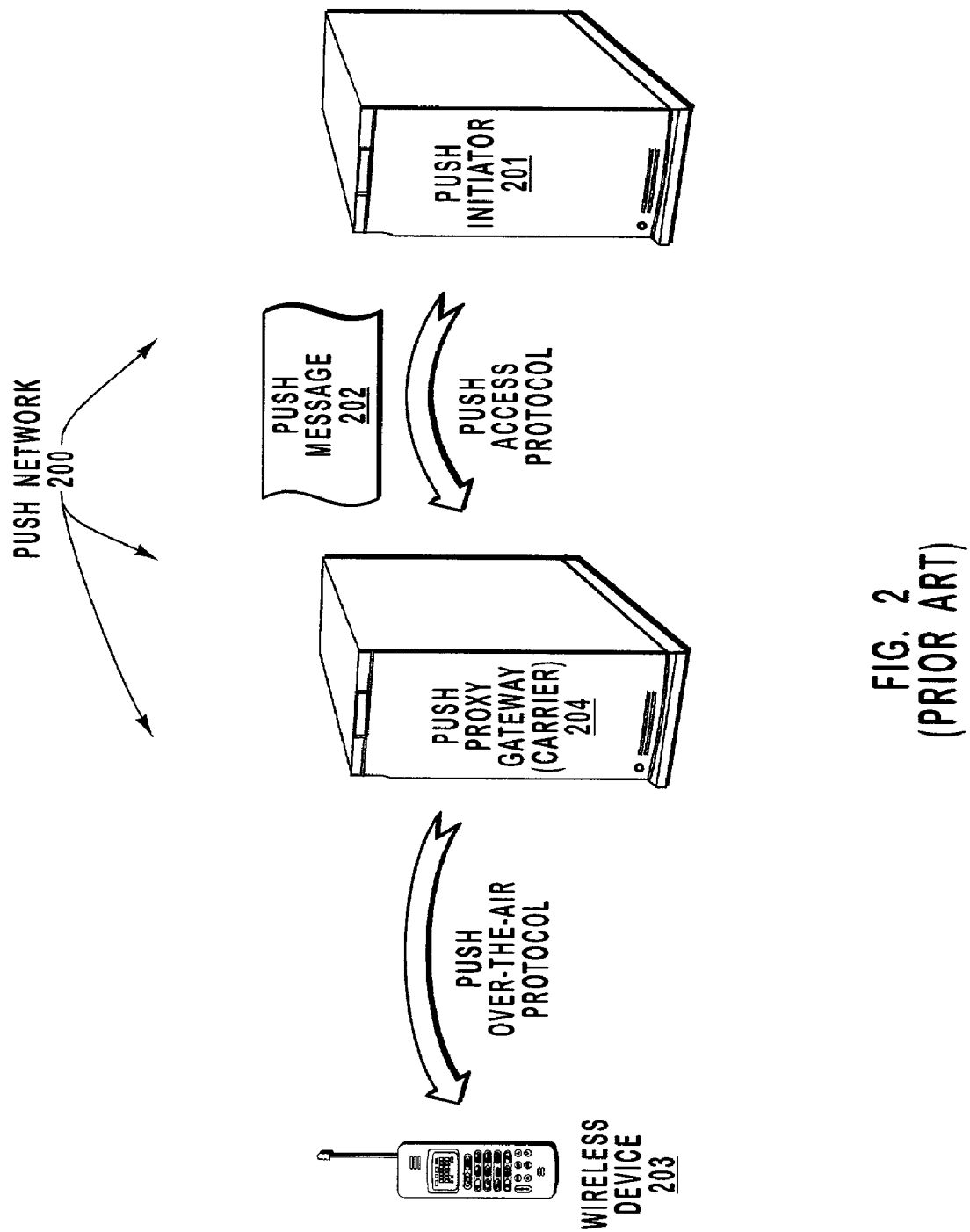
FIG. 2 illustrates a push network that represents a specific example of the conventional network of FIG. 1, in which a push proxy gateway represents a message transit point.

The present invention extends to methods, systems and computer program products for providing end-to-end security when transmitting a notification from a notification source to a notification sink over a notification mechanism that includes one or more message transit points. The message transit points represent network locations that have access to the notification so as to be able to store or render the notification in readable form. The present invention facilitates secure end-to-end notification despite such message transit points.

Initially, a notification sink such as a wireless device negotiates security information with the notification source out-of-band from the notification mechanism. In this description and in the claims, negotiating "out-of-band from the notification mechanism" means that the security information is negotiated without the message transit points becoming apprised of the security information. Instead, the security information is shared only between the notification source and sink. When a notification is to be sent, the notification source generates a notification such as a push message that includes an encrypted form of the notification, as well as clear-text supplemental information that may be used to decrypt the notification. The notification sink then uses the security information previously negotiated, as well as the supplemental information provided in the notification, to decrypt the notification. The message transit points were not apprised of the security information needed to decrypt the notification. Accordingly, the notification traverses the message transit points without the content of the notification becoming clear to the message transmit points.

In the following description, the principles of the present invention are described using an example embodiment in which the notification is a push message. However, it will be apparent to those of ordinary skill in the art, after having reviewed this description, that the principles of the present invention may apply to notification other than push messages. In this description and in the claims, a "notification" refers to any message that is electronically communicated between two end-points, regardless of the form and content of the message, and regardless of the protocol used to communicate the message. Thus, e-mails, instant messages, or any other electronic messages may be considered notifications within the scope of this definition.

Also, in the description and in the claims, an "automatically-generated" notification refers to a notification that is automatically generated at the notification source without synchronous user intervention. In this description and in the claims, a "subscription-based" notification refers to a notification that is generated in response to an express subscription to be notified in response to an event.

Embodiments within the scope of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps and acts of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 3:
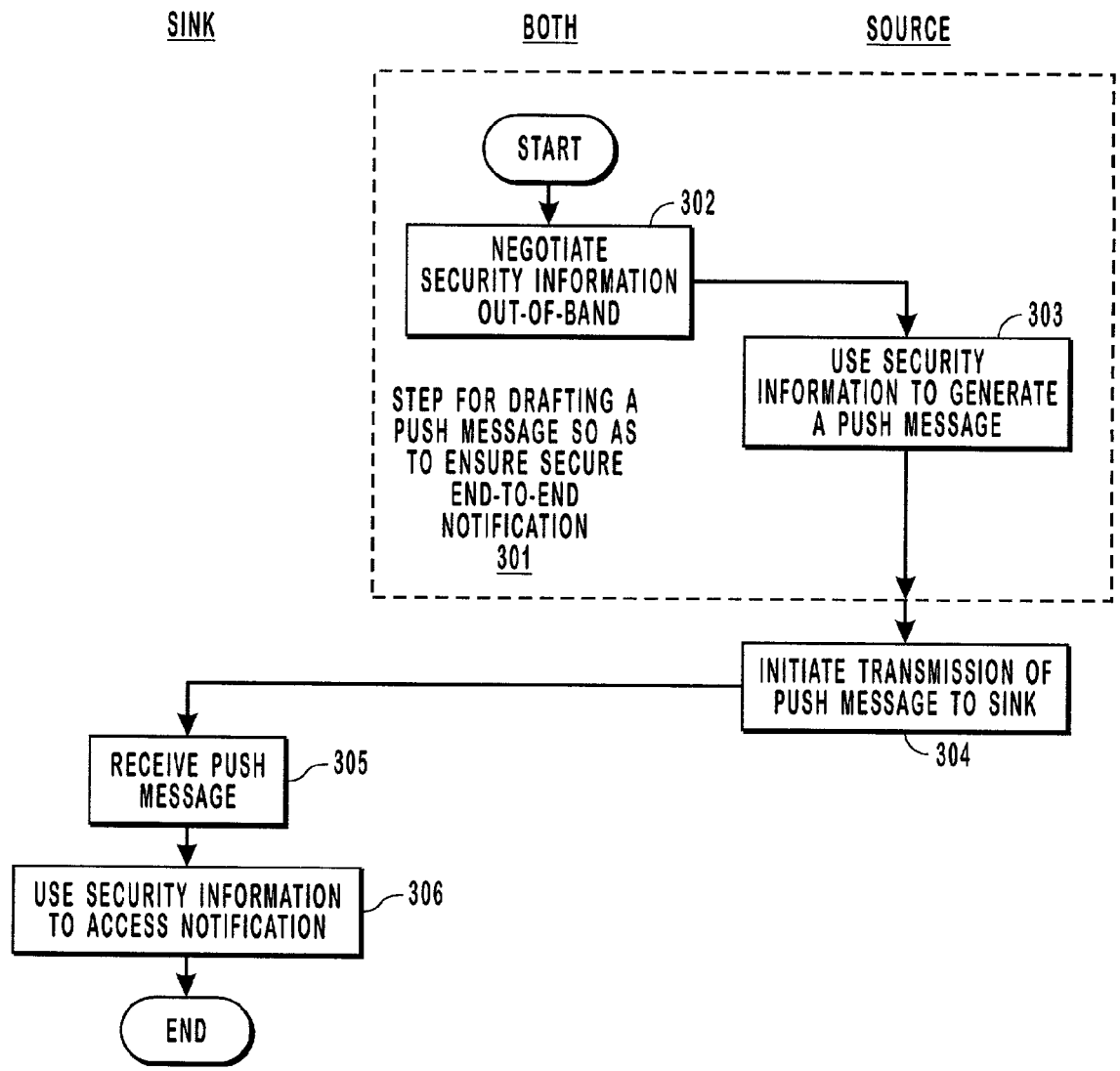
FIG. 3 is a flowchart of a method for providing secure end-to-end notification through one or more message transit points in accordance with the present invention.

FIG. 3 is a flowchart of a method 300 for providing secure end-to-end notifications in accordance with the present invention. Some acts are performed by the notification source as listed in the right column of FIG. 3 under the heading "SOURCE". Some acts are performed by the notification sink as listed in the left column of FIG. 3 under the heading "SINK". Other acts are performed cooperatively by both the notification source and the notification sink as listed in the middle column of FIG. 3 under the heading "BOTH".

The method 300 initially includes a step for drafting a push message so as to ensure secure end-to-end notification between the notification source and the notification sink (step 301). This step is result-oriented and includes any corresponding acts for accomplishing this result. A particular example of such acts includes an act of the notification source and sink cooperatively negotiating security information out-of-band from the notification mechanism (act 302) and then an act of using the security information to generate a push message that includes an encrypted form of the notification as well as clear-text supplemental information that may be used to decrypt the notification (act 303).

Figure 4:
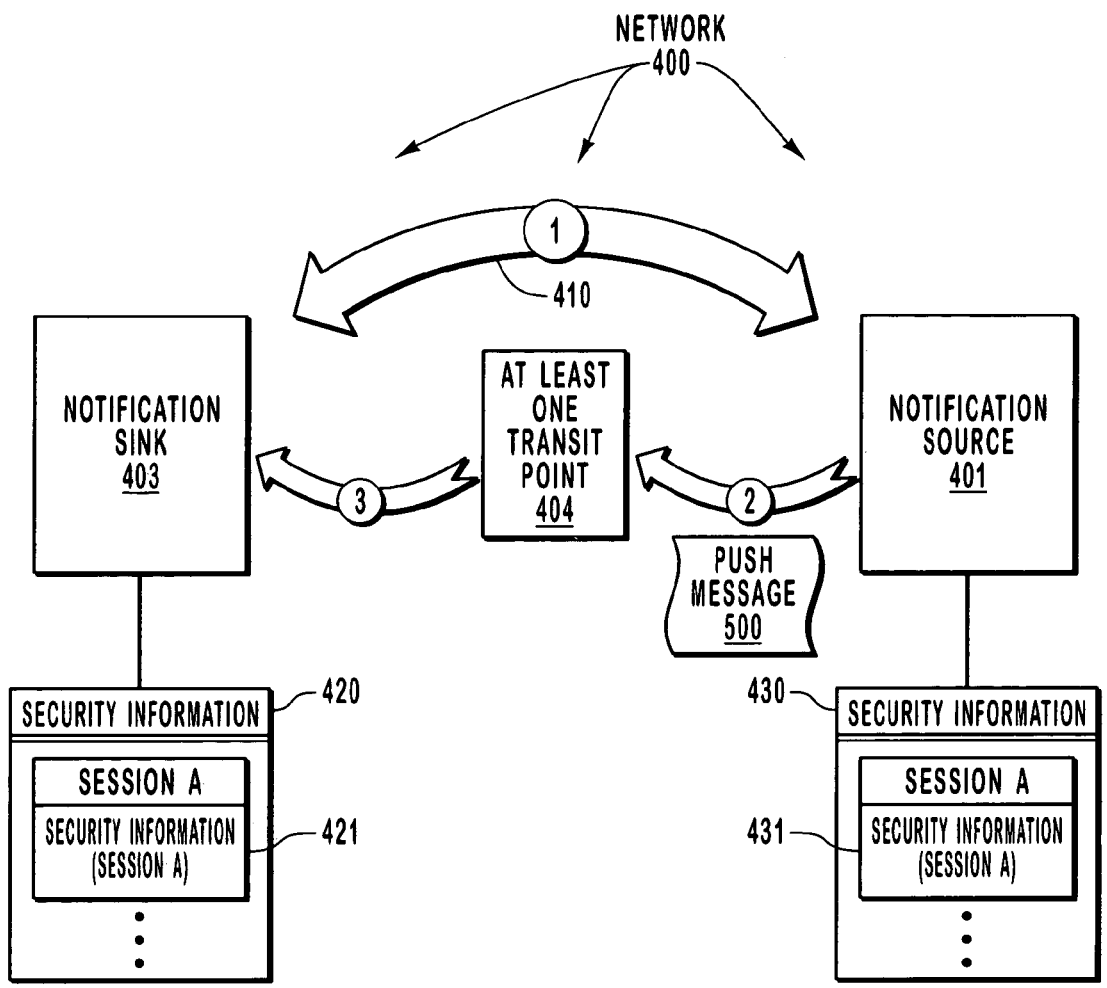
FIG. 4 schematically illustrates a general network in which the present invention may operate and that includes logical flows involved with negotiating security information out-of-band and transmitting a push message that contains a notification from the notification source to the notifications sink.

FIG. 4 illustrates a network 400 in which there are logical flows between a notification source 401 and a notification sink 403. Arrow 410 of FIG. 4 represents the bi-directional communication that may be involved with negotiating the security information. In one example, the notification sink 403 may negotiate the security information by connecting to an initial browse point using browsing software running on the notification sink 403. The initial browse point may be represented in the form of a Uniform Resource Identifier (URI). The initial browse point may be set for the notification sink through device provisioning. In addition, there may be different browse points set for different notification sources. In one embodiment, the notification sink 403 is a wireless device. In the remainder of this description, the notification sink 403 will often be referred to as wireless device 403 although the principles of the present invention are not so limited.

The wireless device 403 securely browses to the initial browse point using, for example, the Secure Socket Layer (also called "SSL") protocol. Using this protocol, the wireless device 403 provides a Security Parameter Index (also called "SPI") that may be used to identify a notification session. The SPI is, for example, a 32-bit value that is unique to the wireless device 403, and that may serve as a handle into the appropriate security context for the notification session. The wireless device 403 may also suggest other security information such as the master secret, the cryptographic algorithm (e.g., NULL for none, DES, 3DES, RC5 or the like), the key length, the has algorithm (e.g., NULL, MD5-HMAC, $SHA_{13}$ HMAC, $MD5_{13}$ RCA, $SHA_{13}$ RCA or the like), the session expiration (in time and/or in usage), and potentially an exportable keys flag that indicates whether or not this security information is exportable. The wireless device 403 may suggest these parameters in a GET method of a HyperText Transport Protocol (HTTP) request with the parameters included as arguments in the method. The initial browse point of the notification source 401 may then respond with an acceptance or a rejection of these parameters. A rejection may also include a suggestion for alternative values. Ultimately, the required security information for the session is agreed upon.

In one embodiment, the master secret may have a long lifetime on the order of months. To further protect the master secret from discovery during this lifetime, the master secret may be transformed through a Pseudo Random Function (also called "PRF") to generate a different encryption key for each message. The implementation of this option may also be negotiated during this initial negotiation. More regarding the transformation of this master secret is described in commonly-owned co-pending U.S. patent application Ser. No. 09/761,363 filed Jan. 16, 2001 and entitled "Methods and Systems for Generating Encryption Keys Using Random Bit Generators", which application is incorporated herein by references in its entirety.

FIG. 4 illustrates that the notification sink 403 has access to security information 420 such as the security information 421 for the notification session just set up (session A) potentially along with other security information (represented by the vertical ellipses) associated with other notification sessions set up with the same or different notification sources. Likewise, the notification source 401 has security information 430 such as the security information 431 for the notification session just set up (session A) potentially along with other security information (represented by the vertical ellipses) associated with other notification sessions set up with the same or different notification sinks.

Although negotiating security information "out-of-band from the notification mechanism" has been described with respect to negotiating the security information within a secure SSL session, other forms of negotiating out-of-band from the notification mechanism may be performed so long as the message transit points do not become apprised of the security information. For example, if the notification sink is a wireless device that has a docking station that connects to a desktop computer, a docked wireless device may instruct the desktop computer to use its modem to establish a telephone call with the notification source using a wired connection to negotiate the security information. The security information may then be passed to the wireless device via the docking station.

Alternatively, negotiating out-of-band from the notification mechanism may involve the notification sources transmitting the security information to the notification sink using Wireless Application Forum (WAP) provisioning protocols. The security information may also be included with the purchase of the notification sink. For example, the security information may be contained within a memory card. A user may also place a telephone call or otherwise acquire the security information, and manually enter the security information into the notification sink. Those of ordinary skill in the art will appreciate, after having reviewed this description, that other methods for negotiating security information out-of-band from the notification mechanism may be employed, whether those methods now exist, or whether they are to be developed in the future.

Figure 5:
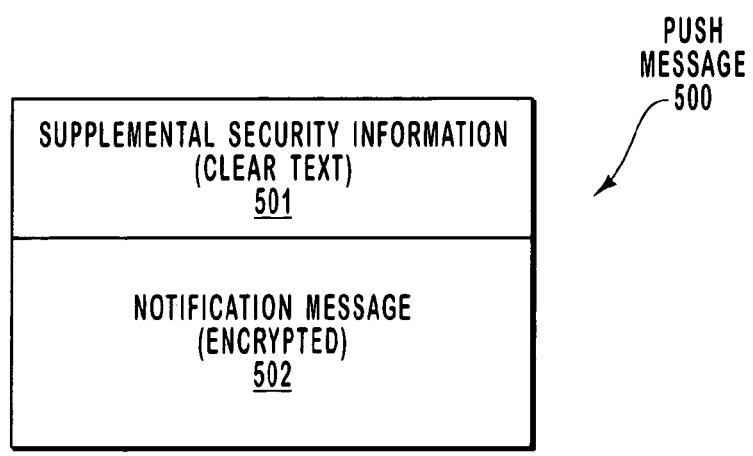
FIG. 5 illustrates a data structure that represents the general form of a push message in accordance with the present invention.

Referring to FIG. 3, once the security information is negotiated out-of-band from the notification mechanism (act 302), the notification source uses the security information to generate a push message (act 303) thus completing the step for drafting a push message so as to ensure secure end-to-end notification (step 301) between the notification source and the notification sink. Referring to FIG. 5, the push message 500 includes an encrypted form of the notification represented as notification message (encrypted) 502, as well as supplemental security information 501 that is represented in clear text and that may be used along with the security information originally negotiated to decrypt the notification message.

The notification source 401 then initiates transmission of the push message 500 to the notification sink 403 (act 304) via the at least one message transit point 404. Although the push message 500 traverses through the at least one transit points 404, the notification message portion of the push message is encrypted. Since the at least one message transit point 404 is not privy to the security information originally negotiated in act 302, the at least one message transit point 404 is not able to decrypt the notification message 502. Once the notification sink 403 receives the push message 500 (act 305), the notification sink 403 decrypts the encrypted notification message 502 using the security information previously negotiated (security information 421) along with potentially the supplemental security information 501 (act 306). Thus end-to-end security is provided since only the notification source 401 and the notification sink 403 are able to access the clear text content of the notification message.

Figure 6:
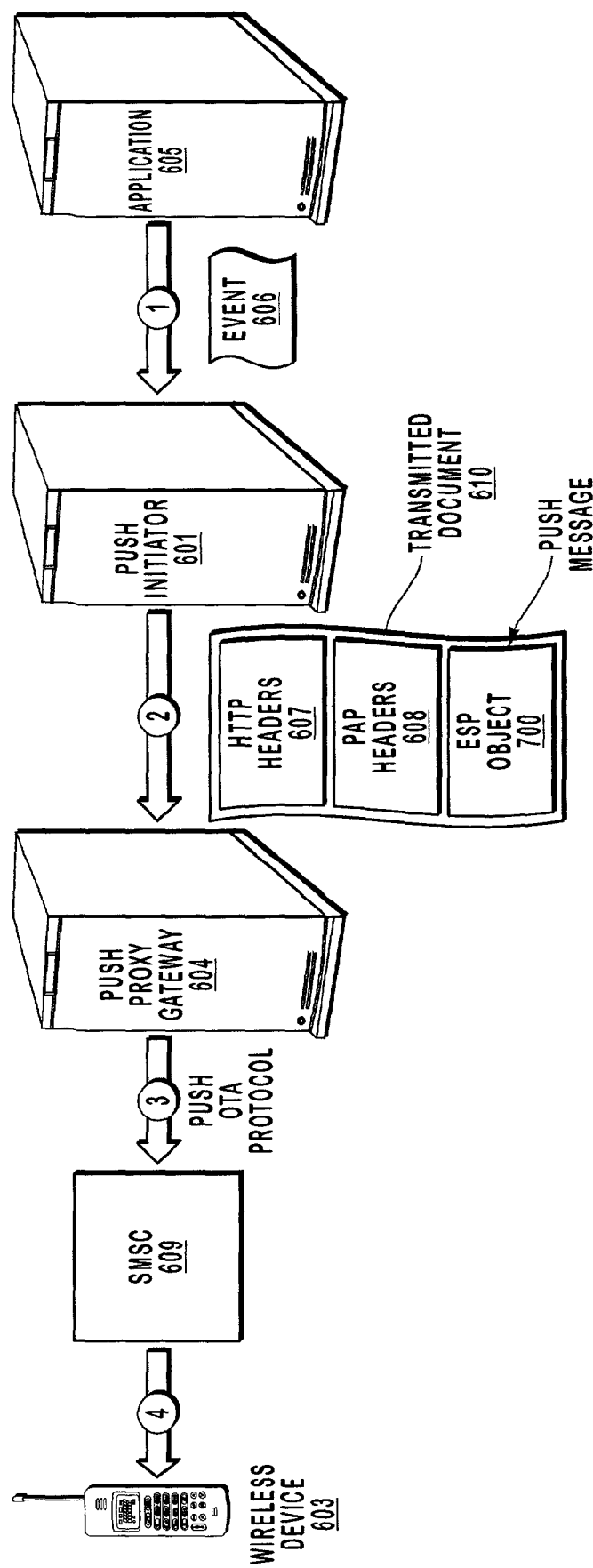
FIG. 6 schematically illustrates a more specific network in which the present invention may operate and that includes logical flows involved with transmitting a push message in the form of an ESP object from a push initiator to a wireless device via a push proxy gateway.

FIG. 6 illustrates a specific example of a network such as network 400. The combination of an application 605 and a push initiator 601 represent an example of a notification source 401. The application 605 detects the occurrence of an event 606, and then passes the event 606 to the push initiator. The push initiator 601 then composes a push message and transmits the push message to a push proxy gateway 604.

Specifically, the push message may be transmitted as part of a transmitted document 610 that may be, for example, a HyperText Transport Protocol (also called "HTTP") message. Accordingly, the transmitted document 610 may contain HTTP headers 607. The push message may be an Encapsulated Security Payload (also called "ESP") object 700 that is contained within a Push Access Protocol (also called "PAP") message that is part of the HTTP message. Accordingly, the transmitted document 610 may also include PAP headers 608. In this description and in the claims, an "ESP object" is an object that is in compliance with the ESP object described in the Internet standard RFC 2406. Notwithstanding such compliance, the ESP object contains features that are not described by, nor rendered obvious in light of the RFC 2406 standard.

The following lists an example of HTTP headers 607.
1. POST /pushserver HTTP/1.1
2. Host: www.pushproxygateway.com
3. Content-Length: xxx
4. Content-Type: multipart/related; boundary=asdlfkjiurwghasf;

The HTTP headers are number with lines numbers 1 through 5 for clarity in describing the headers although the actual HTTP headers would not include such line numbering. Line 1 indicates that the HTTP message is an HTTP Post message in accordance with version 1.1 of the HTTP protocol.

Line 2 is a Host request-header field that identifies the push proxy gateway 604 using a Uniform Resource Identifier (in this case, www.pushproxygateway.com). If the port number of the push proxy gateway 604 is other than the default port for HTTP post requests, then the Host request-header field would also specify that port number.

Line 3 is a Content-Length header field that indicates the size of the body of the HTTP message. The body of the HTTP message would include all of the HTTP message except for the HTTP headers 607. Here, "xxx" indicates that the content length has no specified value.

Line 4 is a Content-Type header field that indicates the media type of the HTTP message body. Here, the body is a multipart message having related components. In addition, each of the multipart components are divided by a text boundary defined by "asdlfkjiurwghasf".

The PAP headers 608 may be as presented in the following lines 5 through 24. In particular, the PAP headers are largely in the form of an XML document that represents a multipart segment of the multipart message.

```
5.    --asdlfkjiurwghasf
6.    Content-Type: application/xml
7.    <?xml version="1.0"?>
8.    <pap>
9.        <push-message
10.           push-id=9fjeo39jf084@airstream.com
11.           deliver-after-timestamp="2002-01-21T00:17:00Z"
12.           source-reference="Your Stocks"
13.           ppg-notify-requested-to="http://www.notify.com">
14.           <address
15.               address-value="wappush=12345/type=
16.                   user@ppg.operator.com">
17.           </address>
18.           <quality-of-service
19.               priority=high
20.               delivery-method=preferconfirmed
21.               bearer=SMS>
22.           </quality-of-service>
23.       </push-message>
24.   </pap>
```

Line 5 represents the boundary of a first multipart segment (compare with the boundary definition in line 4 of the HTTP headers).

Line 6 indicates the media-type (in this case, XML) of the first multipart segment.

Line 7 indicates that the first multipart segment follows version 1.0 of the eXtensible Markup Language (also called "XML") protocol.

Line 8 is an opening tag that corresponds with a closing tag on line 24, which together indicate that the intermediary material from line 9 through line 23 represent information related to a PAP message.

Line 9 through line 13 represents an opening tag of a push-message element, that corresponds to a closing tag on line 23. This opening tag and closing tag indicates that the material from line 14 through line 22 are elements describing the push message. The opening tag has several corresponding attributes. Line 10 is a push-id attribute that serves as an identifier for the push message. The identifier is assigned by the push initiator 601. Line 11 is an attribute that specifies that the push message must not be delivered before the specified time. In this example, that time is Jan. 21, 2002 at 12:17 a.m. according to UTC time ("Z" indicates the use of UTC time). Line 12 identifies a contextual name of the content provider (in this case called "Your Stocks"). The content provider may be, for example, the application 605. Line 13 identifies a URI address that responses to the PAP delivery will be directed to (in this case "http://www.notify.com").

Line 14 through line 17 represent an address element that instructs the push proxy gateway 604 to send the push message to a specified address (in this case, "wappush=12345/type=user@ppg.operator.com"). In this case, that address would correspond to the address of the wireless device 603.

Lines 18 through 22 are a quality-of-service element that instructs the push proxy gateway to send the push message using "high" priority rules and "prefer confirmed" rules. The push initiator 601 and the push proxy gateway 604 would have an understanding about what these rules are. Line 21 indicates that the push proxy gateway should use a Short text Message Service Carrier (also called "SMSC") such as SMSC 609 when delivering the message over the air.

Thus the first multipart segment includes a series of instructions arranged in accordance with XML directing the push proxy gateway 605 on how to send the push message to the wireless device 603. The remainder of the multipart message includes a second multipart segment that identifies the push message to be forwarded to the wireless device 603. In particular, the example multipart message may be as follows:

```
25.    --asdlfkjiurwghasf
26.    X-WAP-Initiator-URI: http://www.initiator.com
27.    Content Type: application/x-esp-mime;
28.        Name="spap.esp"
29.    Content-Transfer-Encoding: base64
30.    Content Disposition: attachment;
31.        Filename="spap.esp"
32.    [BLANK LINE]
       [Encrypted contents using ESP format]
```

Line 25 identifies the start of a second multipart segment. Line 26 identifies the URI of the push initiator 601 (in this case, "www.initiator.com"). Line 27 indicates that the media type of the second multipart segment includes an ESP object. Line 28 specifies the name of the ESP object as "spap.esp". Line 29 indicates that the ESP object is encoded using Base-64 encoding. Line 30 indicates that the ESP object is to be encoded as a MIME attachment when transmitted using SMS. Line 31 repeats the file name. Line 32 is a blank line indicating that the material following line 32 until the next boundary (or until the end of the HTTP message in this case) represents the ESP object.

Figure 7:
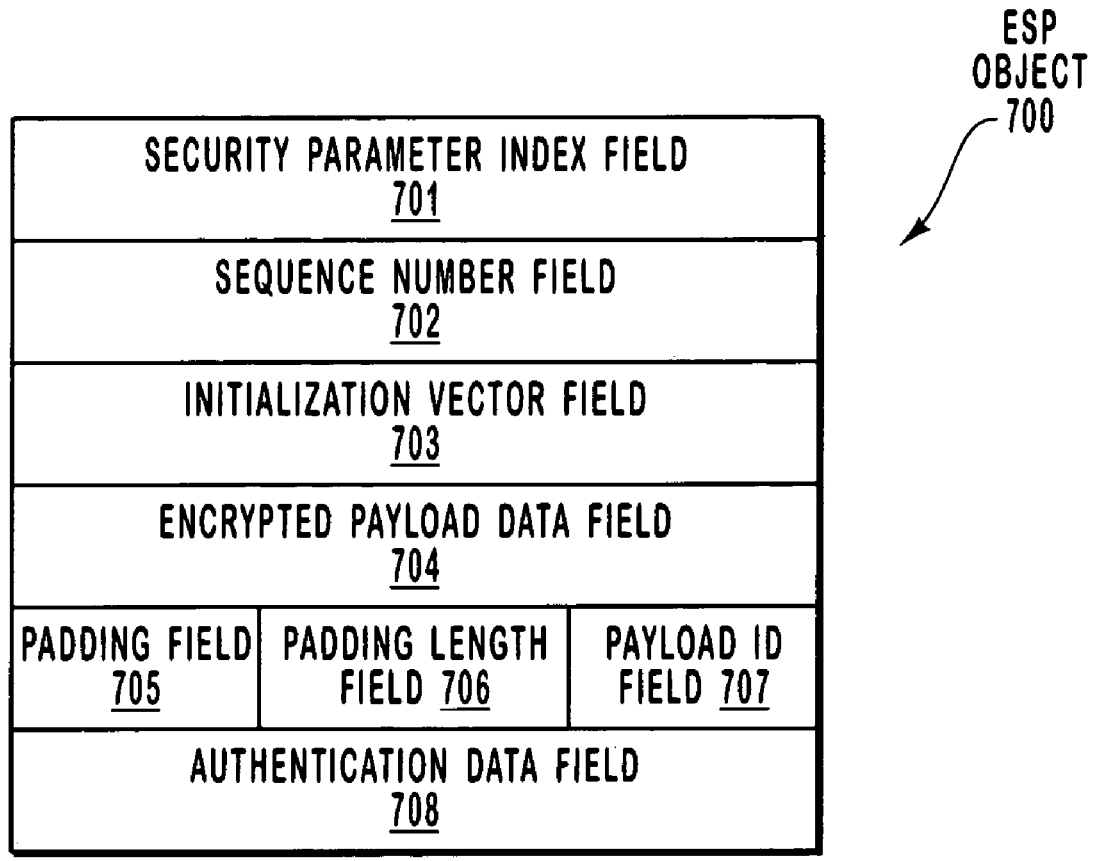
FIG. 7 illustrates a data structure of a push message body in the form of an Encapsulated Security Payload (ESP) object.

FIG. 7 schematically illustrates the structure of such the ESP object 700. The ESP object 700 includes a Security Parameter Index (SPI) field 701 that represents a 32-bit value that identifies the notification session (and thus the security context). Recall that this 32-bit value is unique within the wireless device 603 and was one of the security information that was negotiated in act 302. The SPI field 701 along with the Internet Protocol (IP) address of the wireless device 603 and the security protocol (in this case, ESP) define a Security Association (also called an "SA") for the ESP object 700.

The ESP object 700 also includes a sequence number field 702 that is a monotonically increasing 32-bit value. When the security association is created for an ESP object, the sequence number field is initialized to zero. Each successive ESP object having the same security association has a successively incremented value in the sequence number field. The Initialization Vector (also called "IV") field 703 represents a value that is input into the initially negotiated cryptographic algorithm in order to decrypt the notification. The SPI field 701, the sequence number field 702, and the initialization field 703 are in clear text. Thus, these three fields represent an example of the supplemental security information 501 of the push message 500.

The encrypted payload data field 704 is a variable length field that actually contains the encrypted form of the notification, as well as potentially some encrypted header fields. For example, the field 704 may include a content type field as well as a Wireless Application Protocol (also called "WAP") application ID field. The content type field may identify the presence of XML in the multipart message, while the WAP application ID field identifies the application the device should call to process the push message. The padding field 705 ranges from zero to 255 bytes and is often used when cryptographic algorithms require the cipher text to be a certain length or, regardless of the cryptographic algorithm, padding is needed to terminate the cipher text on a 4-byte boundary. The padding length field 706 is an 8-bit value that specifies the length of the padding field 704 in bytes. The payload ID field 707 (also called the "next field" in the ESP standard) identifies the type of data included in the payload data field 703. The payload data field 704, the padding field 705, the padding length field 706, and the payload ID field 707 are all encrypted. The payload data field 704 represents an example of the notification message 502 of the push message 500. ESP object 700 may also include authentication data field 708 that includes a digital signature for authenticating the push initiator 601.

Note that the notification itself, being represented in the payload data field 704, is also encrypted. Accordingly, the push proxy gateway 604 cannot decrypt the notification. Thus, the notification remains a secret between the notification source (e.g., the push initiator 601) and the notification sink (e.g., the wireless device 603), even though the notification passes through at least one message transit point (e.g., push proxy gateway 604) during transmission.

Although a specific example of a message transit point has been provided as being a push proxy gateway, other types of message transit points may include a corporate proxy server associated with the wireless device 603. For example, the notification may first be dispatched to the corporate proxy server, and then passed through a push proxy gateway to the wireless device, thus involving two message transit points.

The precise hardware that implements the principles of the present invention is not important to the present invention. For example, the notification source 401 and the each of the at least one message transit point 404 may be a server, a server cluster, or any other general-purpose or special purpose computing system, regardless of its physical form, so long as at is capable of implementing the principles of the present invention. In addition, the notification source 401 may be co-located and/or within a common sphere of trust with one or more of the at least one message transmit points 404. For example, the push initiator 601 may be co-located and/or within a common sphere of trust with the push proxy gateway 604.

Also, the notification sink 403 may also be any general-purpose or special-purpose computing device or system that is capable of receiving the push message. While notification to wireless devices allows for timely information to follow a wireless device user, the principles of the present invention are useful in other types of computing devices or systems as well, regardless of whether the computer devices and system are mobile.

Notwithstanding the independence of the principles of the present invention on the hardware operating environment, an example hardware environment is described for the sake of completeness and clarity, but not for the purpose of limiting the scope of the invention to any particular hardware environment.

Figure 8:
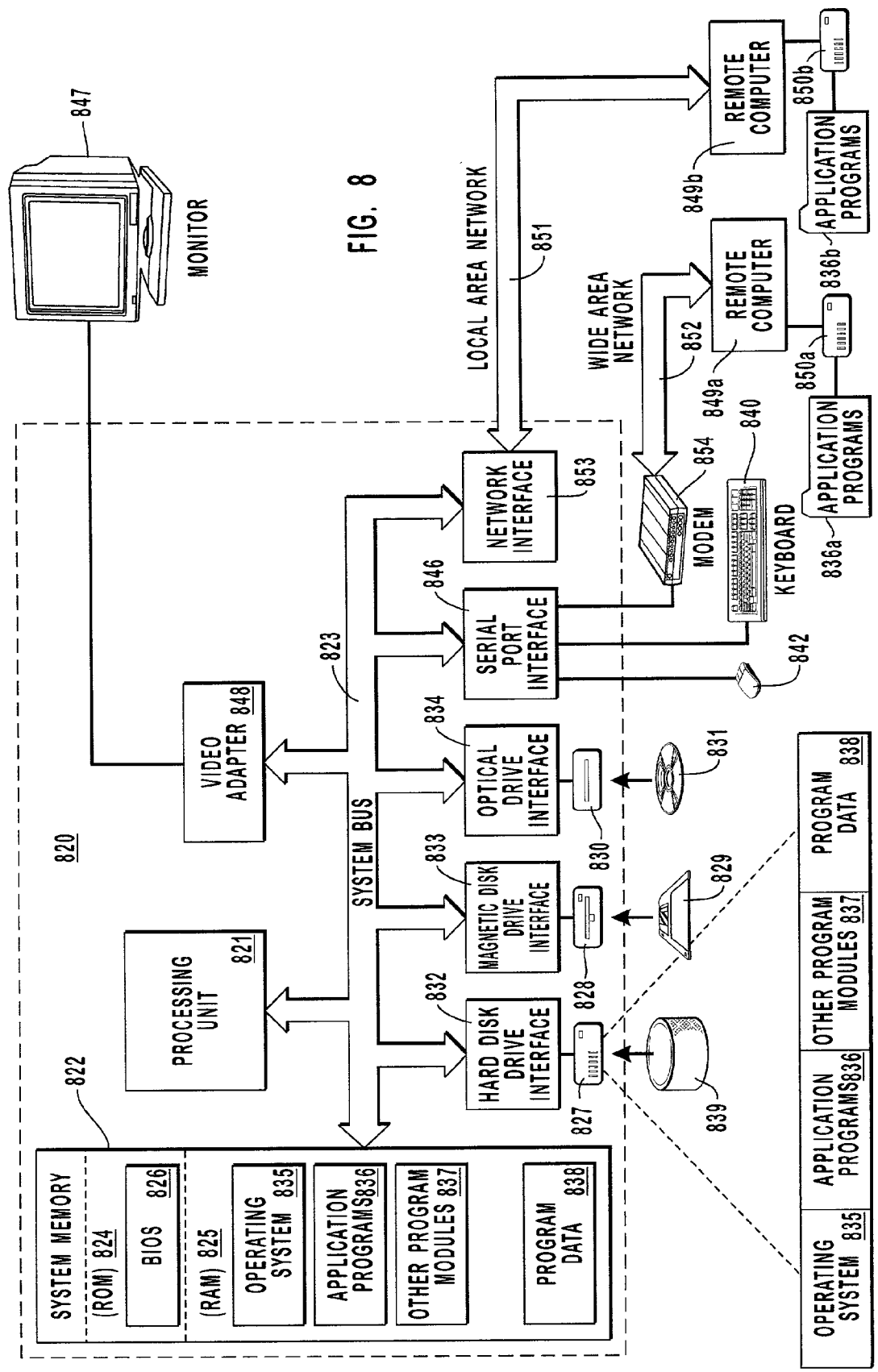
FIG. 8 illustrates a computer system that represents one of a wide-variety of hardware environments in which the principles of the present invention may be employed.

With reference to FIG. 8, an example system for implementing the invention includes a general purpose computing device in the form of a computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824. A computer such as computer 820 may run each of the notification source 401, the at least one message transmit points 404, the notification sink. Although the computer 820 is illustrated as being a desk-top computer, compact devices are now capable of implementing general-purpose computing functionality, with some difference in memory and processing capability, and some limitations in user interfaces as compared to desk top computers.

The computer 820 may also include a magnetic hard disk drive 827 for reading from and writing to a magnetic hard disk 839, a magnetic disk drive 828 for reading from or writing to a removable magnetic disk 829, and an optical disk drive 830 for reading from or writing to removable optical disk 831 such as a CD-ROM or other optical media. The magnetic hard disk drive 827, magnetic disk drive 828, and optical disk drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disk 831, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 839, magnetic disk 829, optical disk 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849*a* and 849*b*. Remote computers 849*a* and 849*b* may each be another personal computer, a server, a router, a network PC, a peer device or other common network node, and typically include many or all of the elements described above relative to the computer 820, although only memory storage devices 850*a* and 850*b* and their associated application programs 836*a* and 836*b* have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

Accordingly, the principles of the present invention allow for the secure end-to-end notification over networks that have one or more transit points. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network that includes at least one notification source and at least one notification sink, the network supporting a notification mechanism by which the notification source passes notifications to the notification sink via at least one message transit point, a method for securely passing a notification from the notification source to the notification sink using the notification mechanism while providing end-to-end security despite the existence of the at least one message transit point, the method comprising the following:
an act of negotiating security information between the notification source and the notification sink out of band from the notification mechanism over which the notification source is configured to send notifications to the notification sink, which notifications are secured using the negotiated security information, the out-of-band negotiating occurring through a network connection that excludes the at least one message transit point, and such that the at least one message transit point through which the notification mechanism subsequently sends notifications from the notification source to the notification sink is bypassed during the out of band negotiating;
after the security information has been negotiated, an act of using the security information to generate an HTTP message that includes an encrypted form of the notification, the HTTP message being included in a PAP message containing an ESP object, wherein the PAP message has at least one PAP header, and wherein the at least one PAP header include a schema document specifying an address of the notification sink for facilitating point-to-point transmission of the generated message, the generated HTTP message further including clear-text supplemental information that may be used by the notification sink to decrypt the notification using the security information; and
an act of initiating transmission of the HTTP message to the notification sink via the at least one message transit point using the notification mechanism, wherein the notification sink is configured to decrypt the notification using the clear-text supplemental information included in the HTTP message and the security information previously negotiated between the notification source and the notification sink.

2. A method in accordance with claim 1, wherein the act of using the security information to generate an HTTP message that includes an encrypted form of the notification comprises the following:
an act of using the security information to generate an HTTP message that includes an encrypted form of an automatically-generated notification.

3. A method in accordance with claim 1, wherein the act of using the security information to generate an HTTP message that includes an encrypted form of the notification comprises the following:
an act of using the security information to generate an HTTP message that includes an encrypted form of a subscription-based notification.

4. A method in accordance with claim 1, wherein the at least one message transit point comprises a server maintained by a wireless carrier, wherein the act of initiating transmission of the HTTP message to the notification sink comprises the following:
an act of initiating transmission of the HTTP message to a wireless device via the server maintained by the wireless carrier.

5. A method in accordance with claim 1, wherein the at least one message transit point comprises a server, wherein the act of initiating transmission of the HTTP message to the notification sink comprises the following:
an act of transmitting the HTTP message to the server using a first protocol, wherein the server transmits the HTTP message to a wireless device using a second protocol.

6. A method in accordance with claim 5, wherein the act of transmitting the HTTP message to the server using a first protocol comprises the following:
an act of transmitting the HTTP message to a Push Proxy Gateway (PPG).

7. A method in accordance with claim 6, wherein the HTTP message is included as a multipart segment.

8. A method in accordance with claim 7, wherein the server is configured to extract the HTTP message from the PAP message and transmit the HTTP message to the wireless device.

9. A method in accordance with claim 8, wherein the server is configured to extract the HTTP message from the PAP message and encode the HTTP message in a Push Over-the-Air protocol message.

10. A method in accordance with claim 1, wherein the clear-text supplemental information that may be used to decrypt the notification using the security information comprises a session identifier field.

11. A method in accordance with claim 1, wherein the encrypted form of the notification comprises a payload data field.

12. A method in accordance with claim 1, wherein the at least one message transmit point comprises a corporate server.

13. A method in accordance with claim 1, wherein the act of negotiating security information between the notification source and the notification sink comprises the following:
   an act of establishing a secure session between the notification source and the notification sink.

14. A method in accordance with claim 13, wherein the act of establishing a secure session between the notification source and the notification sink comprises the following:
   an act of establishing a Secure Socket Layer (SSL) session between the notification source and the notification sink.

15. A method in accordance with claim 1, wherein the act of negotiating security information between the notification source and the notification sink comprises:
   an act of negotiating a master secret shared by the notification source and the notification sink.

16. A method in accordance with claim 1, wherein the act of negotiating security information between the notification source and the notification sink comprises:
   an act of negotiating a cryptographic algorithm to be used when encrypting and decrypting notifications.

17. In a network that includes at least one notification source and at least one notification sink, the network supporting a notification mechanism by which the notification source passes notifications to the notification sink via at least one message transit point, a method for securely passing a notification from the notification source to the notification sink using the notification mechanism while providing end-to-end security despite the existence of the at least one message transit point, the method comprising the following:
   a step for drafting a message so as to ensure secure end-to-end notification between the notification source and the notification sink, including an act of negotiating security information between the notification source and the notification sink out of band from the notification mechanism over which the notification source is configured to send notifications to the notification sink, which notifications are secured using the negotiated security information, the out-of-band negotiating occurring through a network connection that excludes the at least one message transit point, and such that the at least one message transit point through which the notification mechanism subsequently sends notifications from the notification source to the notification sink is bypassed during the out of band negotiating, and wherein the drafted message is an HTTP message that includes an encrypted form of the notification, the HTTP message being included in a PAP message containing an ESP object and at least one PAP header, wherein the at least one PAP header includes a schema document specifying an address corresponding to the notification sink for facilitating point-to-point transmission of the drafted HTTP message, and the HTTP message further including clear-text supplemental information; and
   an act of initiating transmission of the HTTP message to the notification sink using the address of the notification sink and via the at least one message transit point using the notification mechanism, wherein the notification sink is configured to decrypt the notification using the clear-text supplemental information included in the HTTP message and the security information previously negotiated between the notification source and the notification sink.

18. A computer program product for use in a network that includes at least one notification source and at least one notification sink, the network supporting a notification mechanism by which the notification source passes notifications to the notification sink via at least one message transit point, the computer program product for implementing a method for securely passing a notification from the notification source to the notification sink using the notification mechanism while providing end-to-end security despite the existence of the at least one message transit point, the computer program product comprising:
   one or more computer-readable storage media having stored thereon computer executable instructions that, when executed by a processor, cause a computing system to perform the method for securely passing the notification, the method including:
   negotiating security information between the notification source and the notification sink out of band from the notification mechanism over which the notification source is configured to send notifications to the notification sink, which notifications are secured using the negotiated security information, the out-of-band negotiating occurring through a network connection that excludes the at least one message transit point, and such that the at least one message transit point through which the notification mechanism subsequently sends notifications from the notification source to the notification sink is bypassed during the out of band negotiating;
   using the security information to generate an HTTP message after the security information has been negotiated, the HTTP message including an encrypted form of the notification, and the HTTP message being included within a PAP message containing an ESP object and at least one PAP header, the at least one PAP header including a schema document specifying an address of the notification sink for facilitating point-to-point transmission of the generated HTTP message, the generated HTTP message further including clear-text supplemental information that may be used by the notification sink to decrypt the notification using the security information; and causing the HTTP message to be transmitted to the notification sink via the at least one message transit point using the notification mechanism, wherein the notification sink is configured to decrypt the notification using the clear-text supplemental information included in the HTTP message and the security information previously negotiated between the notification source and the notification sink.

19. A computer program product in accordance with claim 18, wherein causing the HTTP message to be transmitted to the notification sink comprise the following:
  causing the HTTP message to be transmitted to the server using a first protocol, wherein the server transmits the HTTP message to a wireless device using a second protocol.

20. A computer program product in accordance with claim 19, wherein causing the HTTP message to be transmitted to the server using a first protocol comprise the following:
  causing the HTTP message to be transmitted to a Push Proxy Gateway (PPG).

21. A computer program product in accordance with claim 18, wherein negotiating security information between the notification source and the notification sink comprises the following:
  establishing a secure session between the notification source and the notification sink.

22. In a network that includes at least one notification source and at least one notification sink, the network supporting a notification mechanism by which the notification source passes notifications to the notification sink via at least one message transit point, a method for securely receiving a notification from the notification source using the notification mechanism while providing end-to-end security despite the existence of the at least one message transit point, the method comprising the following:
  an act of negotiating security information between the notification source and the notification sink out of band from the notification mechanism over which the notification source is configured to send notifications to the notification sink, which notifications are secured using the negotiated security information, the out-of-band negotiating occurring through a network connection that excludes the at least one message transit point, and such that the at least one message transit point through which the notification mechanism subsequently sends notifications from the notification source to the notification sink is bypassed during the out of band negotiating;
  after the security information has been negotiated, an act of receiving an HTTP message from the notification source that was received via the at least one message transit point using the notification mechanism, wherein the HTTP message includes an encrypted form of the notification, the HTTP message being included in a PAP message with an ESP object and one or more PAP headers, wherein the one or more PAP headers includes a schema document specifying an address of the notification sink for facilitating point-to-point transmission of the HTTP message, the HTTP message further including clear-text supplemental information that may be used by the notification sink to decrypt the notification using security information; and
  an act of using the security information previously negotiated between the notification source and notification sink along with the clear-text supplemental information included in the HTTP message to decrypt the encrypted form of the notification also included in the HTTP message.

23. A method in accordance with claim 22, wherein the act of receiving the HTTP message in the PAP message with the ESP object comprises the following:
  an act of receiving the ESP object as a MIME attachment encoded with a Push Over-the-Air protocol message.

24. A computer program product for use in a network that includes at least one notification source and at least one notification sink, the network supporting a notification mechanism by which the notification source passes notifications to the notification sink via at least one message transit point, the computer program product for implementing a method for securely receiving a notification from the notification source to the notification sink using the notification mechanism while providing end-to-end security despite the existence of the at least one message transit point, the computer program product comprising:
  one or more computer-readable storage media having stored thereon computer-executable instructions that, when executed by a processor, cause a computing system to perform the method for securely receiving the notification, the method including:
  negotiating security information between the notification source and the notification sink out of band from the notification mechanism over which the notification source is configured to send notifications to the notification sink, which notifications are secured using the negotiated security information, the out-of-band negotiating occurring through a network connection that excludes the at least one message transit point, and such that the at least one message transit point through which the notification mechanism subsequently sends notifications from the notification source to the notification sink is bypassed during the out of band negotiating;
  detecting the receipt of an HTTP message from the notification source after negotiating the security information between the notification source and the notification sink, the HTTP message including an encrypted form of the notification, and the HTTP message including a PAP message containing an ESP object and at least one PAP header, wherein the at least one PAP header includes a schema document specifying an address of the notification sink for facilitating point-to-point transmission of the generated HTTP message, the HTTP message further including clear-text supplemental information that may be used by the notification sink to decrypt the notification using security information, wherein the HTTP message is received via the at least one message transit point using the notification mechanism; and
  using the security information previously negotiated between the notification source and notification sink along with the clear-text supplemental information included in the HTTP message to decrypt the encrypted form of the notification also included in the HTTP message.

25. A method as recited in claim 1, wherein the schema document is an XML document specifying the address of the notification sink.

26. A method as recited in claim 1, wherein negotiating security information comprises negotiating a session identifier unique within the notification sink, and wherein the generated HTTP message further includes a security association, the security association including the session identifier, an IP address of the notification sink, and a security protocol according to which the message is encrypted.

* * * * *